US008499298B2

(12) United States Patent
Mitchell et al.

(10) Patent No.: US 8,499,298 B2
(45) Date of Patent: Jul. 30, 2013

(54) MULTIPROCESSING TRANSACTION RECOVERY MANAGER

(75) Inventors: Ian James Mitchell, Eastleigh (GB); John Simon Tilling, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/940,480

(22) Filed: Nov. 5, 2010

(65) Prior Publication Data
US 2011/0185360 A1 Jul. 28, 2011

(51) Int. Cl.
*G06F 9/46* (2006.01)

(52) U.S. Cl.
USPC .......................................... 718/101; 718/108

(58) Field of Classification Search
None
See application file for complete search history.

(56) References Cited

U.S. PATENT DOCUMENTS

| | | | | |
|---|---|---|---|---|
| 6,308,287 | B1 * | 10/2001 | Mitchell et al. | 714/19 |
| 6,526,416 | B1 * | 2/2003 | Long | 1/1 |
| 6,604,125 | B1 * | 8/2003 | Belkin | 718/104 |
| 6,873,995 | B2 * | 3/2005 | Benson et al. | 707/607 |
| 7,610,305 | B2 * | 10/2009 | Bhogi et al. | 1/1 |
| 7,640,535 | B2 * | 12/2009 | Somogyi et al. | 717/119 |
| 7,805,706 | B1 * | 9/2010 | Ly et al. | 717/121 |
| 8,108,866 | B2 * | 1/2012 | Anand et al. | 718/102 |
| 2002/0059358 | A1 * | 5/2002 | Kanamori | 709/107 |
| 2004/0216107 | A1 * | 10/2004 | Somogyi et al. | 718/100 |
| 2007/0260908 | A1 * | 11/2007 | Mitchell et al. | 714/2 |
| 2008/0195849 | A1 * | 8/2008 | Gonzalez et al. | 712/223 |
| 2009/0049443 | A1 * | 2/2009 | Powers et al. | 718/100 |
| 2009/0183154 | A1 * | 7/2009 | Miskelly et al. | 718/100 |
| 2009/0210649 | A1 * | 8/2009 | Wan et al. | 711/170 |
| 2010/0228927 | A1 * | 9/2010 | Levanoni | 711/154 |
| 2012/0166889 | A1 * | 6/2012 | El-Kersh et al. | 714/48 |

* cited by examiner

*Primary Examiner* — Emerson Puente
*Assistant Examiner* — Hiren Patel
(74) *Attorney, Agent, or Firm* — David Mims; Robert C. Rolnik

(57) ABSTRACT

A multiprocessing transaction recovery manager, operable with a transactional application manager and a resource manager, comprises a threadsafety indicator for receiving and storing positive and non-positive threadsafety data of at least one transactional component managed by one of the transactional application manager and the resource manager; a commit protocol component for performing commit processing for the at least one transactional component; and a thread selector responsive to positive threadsafety data for selecting a single thread for the commit processing to be performed by the commit protocol component. The thread selector is further operable to select plural threads for the commit processing to be performed by the commit protocol component responsive to non-positive threadsafety data.

9 Claims, 3 Drawing Sheets

MULTIPROCESSING TRANSACTION RECOVERY MANAGER

FOREIGN APPLICATION PRIORITY DATA

This application is a counterpart application of Foreign Patent Application No. 10151919.7, filed in Great Britain on Jan. 28, 2010, which is herein incorporated by reference.

FIELD OF THE INVENTION

The present invention relates to the management of transaction processing systems, and more particularly to the provision of improved management of commit processing in circumstances where transaction threading may be affected by transactional affinities.

DESCRIPTION OF THE RELATED ART

The basic concepts of transaction processing have been known in the art for many years and need no introduction to one of ordinary skill in the art. In particular, the concepts of one-and two-phase commit processing of transactions are well-understood. Similarly, the concept of transactional affinity is well known. "Affinities," in general, refer to data that the application references in the target server, which needs to be subsequently accessed, thus adding a level of difficulty to the ability to multi-thread work whilst the affinity is active. This is because resource managers in typical transaction processing systems may or may not be threadsafe in the presence of such affinities.

Transaction managers provide the operating environment to allow customer written application programs to operate as atomic transactions and update recoverable resources with integrity. These recoverable resources may be local to the transaction manager and managed by it (for example a flat file), or they may be external to the transaction manager, managed by an external resource manager with which the transaction manager communicates (for example, a relational database subsystem).

Transaction managers typically use the two phase commit protocol to coordinate the committing or backing out of recoverable resources that have been updated by a transaction. With the exception of when optimizations, such as single-updater or last-agent can be employed, this involves invoking each resource manager twice.

Resources updated by an application program sometimes have an affinity to the processing thread, meaning the transaction manager's two phase commit invocations to the resource manager must be made on the same processing thread as used for the application's update of the resource.

In addition, for transaction managers that operate with external resource managers, this may necessitate using a different processing thread for the resource manager update than is used for running the user's application program. In such an environment, the two phase commit protocol requires switching from an application thread to a resource manager thread and back again for each invocation of the two phase commit protocol. Conversely transaction managers operating with local resource managers may be able to update local resources under the same processing thread that is running the application code.

Switching processing threads is a performance overhead. In the worst case, if an application has updated n resources, this can result in n*4 thread switches at commit time when implementing the two phase commit protocol.

It is desirable to address these shortcomings of known transaction processing systems wherein the conflicting needs for transactional control of multi-threaded processes and for affinity management of the work requests cannot be reconciled other than partially, and by means of expensive and potentially error-prone application and system redesign.

SUMMARY OF THE INVENTION

The present invention accordingly provides, in a first aspect, a multiprocessing transaction recovery manager, operable with a transactional application manager and a resource manager, comprising: a threadsafety indicator for receiving and storing positive and non-positive threadsafety data of at least one transactional component managed by one of said transactional application manager and said resource manager; a commit protocol component for performing commit processing for said at least one transactional component; and a thread selector responsive to positive threadsafety data for selecting a single thread for said commit processing to be performed by said commit protocol component.

Preferably, said thread selector is further operable to select plural threads for said commit processing to be performed by said commit protocol component responsive to non-positive threadsafety data. Preferably, said thread selector is further operable to select minimal plural threads for said commit processing to be performed by said commit protocol component responsive to a mixture of positive and non-positive threadsafety data stored for plural said transactional components. The thread selector may be further operable to select minimal plural threads for said commit processing to be performed by said commit protocol component responsive to a mixture of positive and non-positive threadsafety data stored for plural said transactional components by grouping threadsafe transactional components for said commit processing under a single thread. Preferably, said resource manager is a database management system. Preferably, the commit protocol component is operable to perform two-phase commit processing.

In a second aspect, there is provided a method of operating a multiprocessing transaction recovery manager, in communication with a transactional application manager and a resource manager, comprising the steps of: receiving and storing, by a threadsafety indicator, positive and non-positive threadsafety data of at least one transactional component managed by one of said transactional application manager and said resource manager; performing, by a commit protocol component, commit processing for said at least one transactional component; and responsive to positive threadsafety data, selecting, by a thread selector, a single thread for said commit processing to be performed by said commit protocol component.

The method may further comprise selecting, by said thread selector, plural threads for said commit processing to be performed by said commit protocol component responsive to non-positive threadsafety data. The method may further comprise selecting, by said thread selector, minimal plural threads for said commit processing to be performed by said commit protocol component responsive to a mixture of positive and non-positive threadsafety data stored for plural said transactional components. The method may further comprise selecting, by said thread selector, minimal plural threads for said commit processing to be performed by said commit protocol component responsive to a mixture of positive and non-positive threadsafety data stored for plural said transactional components by grouping threadsafe transactional components for said commit processing under a single thread. Preferably, said resource manager is a database management system. Preferably, the commit protocol component is operable to perform two-phase commit processing.

In a third aspect, there is provided a computer program comprising computer program code to, when loaded into a computer system and executed thereon, cause said computer system to perform all the steps of the method of the second aspect.

The transaction manager component that implements the commit protocol (the transaction recovery manager) can thus optimize the amount of thread switching by requiring each resource manager to register whether or not it is threadsafe. A resource manager declaring itself as threadsafe is telling the recovery manager that it does not have affinity to the application thread, meaning commit processing can be potentially performed on any thread. In addition, external resource managers may mandate that the application thread is not used.

Today recovery managers typically start commit processing on the application thread and then resource managers implement thread switching as required. Preferred embodiments of the present invention allow the recovery manager to pick a thread to minimize the amount of thread switching required for the commit processing and maximize time spent on a single thread. This gives benefits in terms of less CPU resource consumed (due to less thread switching) and increased throughput benefits, as thread switching typically results in delays caused by waiting for a thread to be redispatched on a processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed descriptions of an illustrative embodiments when read in conjunction with the accompanying drawings, wherein:

DETAILED DESCRIPTION OF THE PREFERRED EMBODIMENT

The recovery manager component of a transaction manager is the component that implements the commit protocol. For simplicity in describing the exemplary embodiment of the present invention, it will be assumed that a two-phase commit protocol is in use. It will, however, be clear to one of ordinary skill in the art that other commit protocols, such as single-phase or three-phase protocols, may be used. In addition, the preferred embodiments of the present invention are operable with optimized protocols, such as commit tree protocols and presume abort/presume commit protocols. The recovery manager can optimize the amount of thread switching by requiring all resource managers (local and external) to register with it and state if they are threadsafe, which indicates whether commit processing can be performed on any thread or whether it must be a specific thread. (Components that interface with the external resource managers may choose to always register as threadsafe and handle thread switching themselves dependent upon the particular external resource manager being used.)

Figure 1:
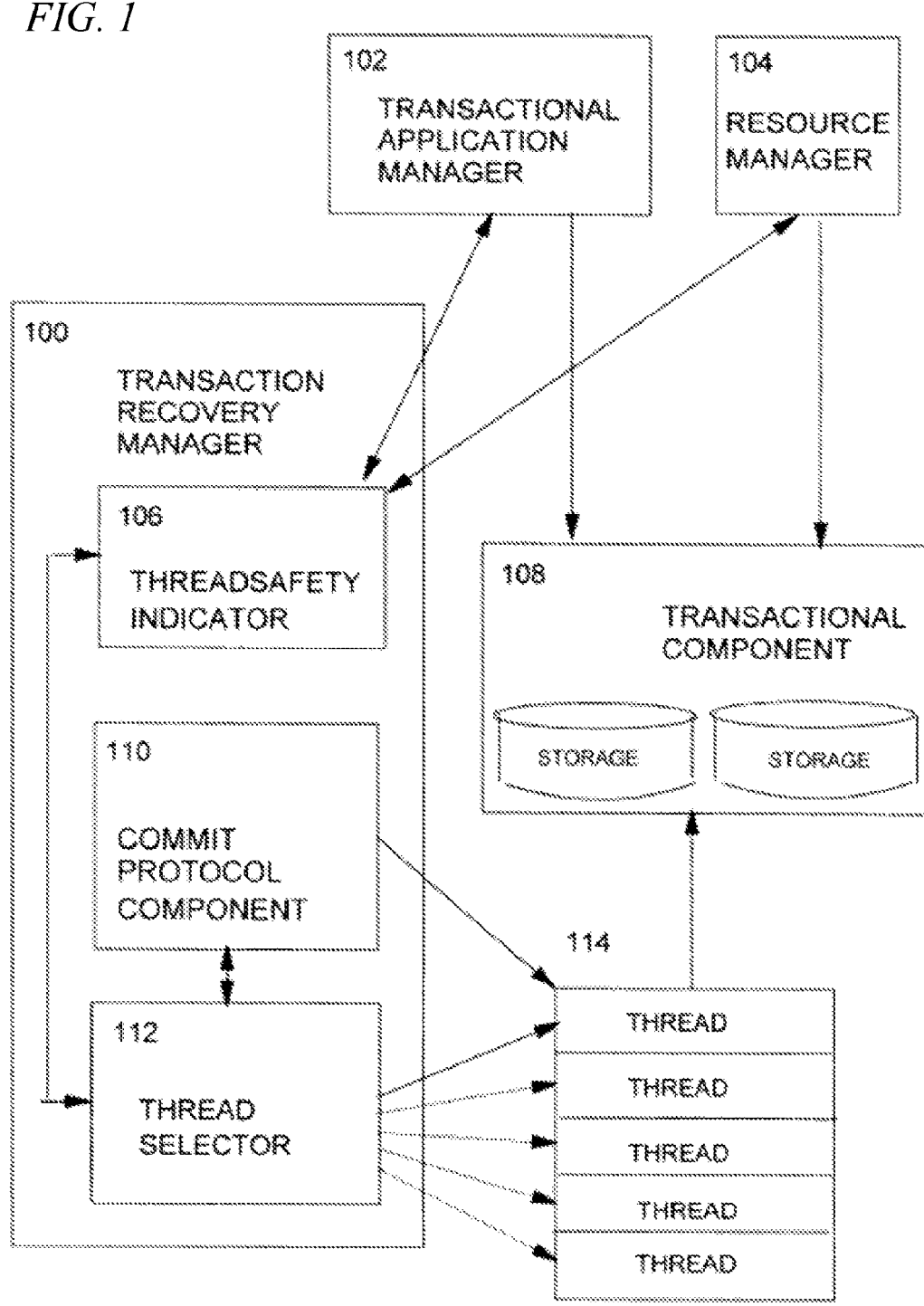
FIG. 1 shows in schematic form the components of a system according to an illustrative embodiment of the invention.

Turning to FIG. 1, there is shown in schematic form the components of a system according to a preferred embodiment of the present invention. In FIG. 1, multiprocessing transaction recovery manager 100 is operable in communication with transactional application manager 102 and resource manager 104, and comprises threadsafety indicator 106 for receiving and storing positive and non-positive threadsafety data of at least one transactional component 108 managed by one of transactional application manager 102 and resource manager 104. Transactional component 108 includes storage for data, the integrity of which must be maintained. Resource manager 104 may be, for example, an external resource manager, such as a database management system. It will be clear to one of ordinary skill in the art that the Figure is much simplified—in reality, such systems typically comprise plural resource managers 104 whose work must be coordinated with one or more transactional application managers 102 in order to maintain the integrity of updates to the data managed thereby. Multiprocessing transaction recovery manager 100 comprises a commit protocol component 110 for performing commit processing for said at least one transactional component 108 and a thread selector 112 responsive to positive threadsafety data stored in threadsafety indicator 106 for selecting a single thread from the plurality of threads 114 for said commit processing to be performed by commit protocol component 110. Thread selector 112 is further operable to select plural threads from the plurality of threads 114 for the commit processing to be performed by commit protocol component 110 responsive to non-positive threadsafety data stored in threadsafety indicator 106. Thread selector 112 is further operable to select minimal plural threads from plurality of threads 114 for the commit processing to be performed by commit protocol component 110 responsive to a mixture of positive and non-positive threadsafety data stored in threadsafety indicator 106 for plural said transactional components.

At commit time, the recovery manager can thus examine which resources have been updated in the unit of work and take account of their thread affinities, if such exist. It can then choose to initiate the commit or back out on a specific thread in order to optimize performance by minimizing the number of thread switches whilst honoring the threadsafety characteristics of each resource manager involved in the unit of work. The method by which the recovery manager selects a thread for processing may take the form of rule-based processing, such as selecting the thread on which most transactional updates have occurred to be the thread for commit protocol processing. If there is a mixture of threadsafe and non-threadsafe elements, the rule applied may be one that seeks to minimize the thread-switching that occurs, for example, by grouping threadsafe elements together to be performed under a single thread. The concept of rules-based processing is well understood by those of skill in the art and need not be further described here.

For example, let us assume application A1 has updated local resource L1 and two separate external databases E1 and E2. The transaction manager can process the update to L1 on the same thread used to run the application code, but for the external databases it has to switch to a different processing thread to update E1 and E2. Let us call the application thread ATHREAD and the thread used to update the external databases ETHREAD.

Let us assume A1 updates L1, E1, and E2 and then issues a commit request running on ATHREAD.

In the known art, the commit processing is always initiated on ATHREAD and the following thread switching occurs for the two phase commit: the prepare to L1 is executed on ATHREAD, the prepare to E1 results in a switch to ETHREAD and a switch back to ATHREAD afterwards. The prepare to E2 likewise results in a switch to ETHREAD and a switch back to ATHREAD afterwards. The commit to L1 is executed on ATHREAD. The commit to E1 results in a switch to ETHREAD and a switch back to ATHREAD afterwards, and the commit to E2 likewise results in a switch to ETHREAD and a switch back to ATHREAD afterwards. In total, eight thread switches have occurred to implement the two phase commit process.

Figure 2:
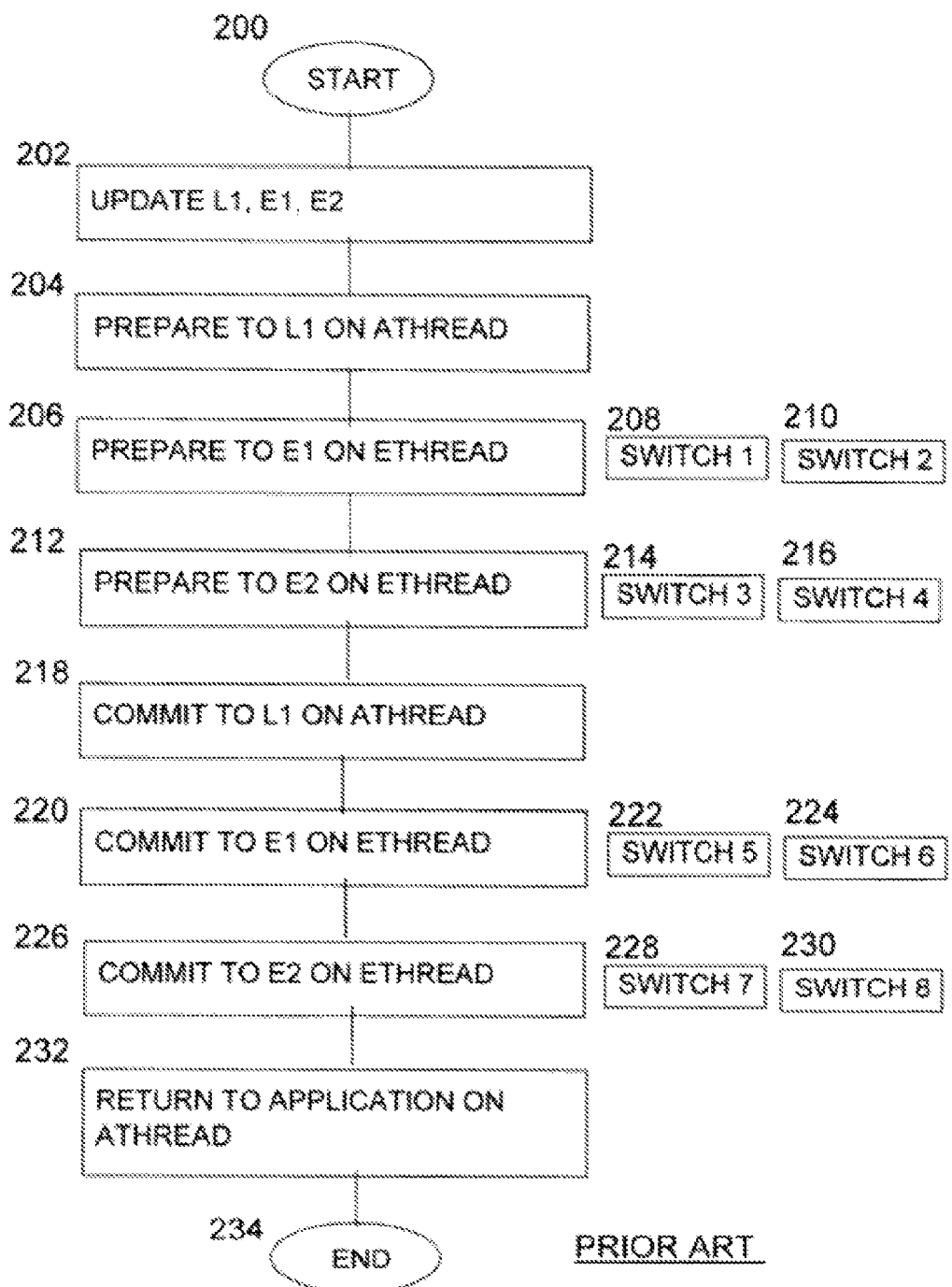
FIG. 2 shows a sequence of process operations according to the prior art.

This process according to the art is illustrated in FIG. 2, starting at START step 200. At step 202, L1, E1 and E2 are updated. At step 204, the commit process begins with a prepare issued to L1 on ATHREAD. Step 206, in which a prepare is issued to E1, causes switch 1 208 from ATHREAD to ETHREAD and switch 2 210 back to ATHREAD. Step 212, in which a prepare is issued to E2 on ETHREAD, causes switch 3 214 from ATHREAD to ETHREAD and switch 4 216 back to ATHREAD. Step 218, in which a commit is issued to L1 is performed on ATHREAD. Step 220, in which a commit is issued to E1 on ETHREAD, causes switch 5 222 from ATHREAD to ETHREAD and switch 6 back to ATHREAD. Step 226, in which a commit is issued to E2 on ETHREAD, causes switch 7 from ATHREAD to ETHREAD and switch 8 back to ATHREAD. At step 232, the process returns to the application on ATHREAD, and at END step 234, the process completes.

Now consider what happens when the improved system according to the preferred embodiment is implemented. L1 has registered as threadsafe, meaning that it can be called on either ATHREAD or ETHREAD. Likewise E1 and E2 have registered as threadsafe. The recovery manager detects that resources L1, E1 and E2 have been updated and that threads ATHREAD and ETHREAD have been used. Because L1, E1 and E2 have been declared threadsafe, the recovery manager is free to choose the thread on which the commit protocol will be run according to some rule—for example, the thread on which most resource updates were processed. In the present exemplary embodiment, the recovery manager elects to perform its processing on ETHREAD and switches from ATHREAD to ETHREAD to start the two phase commit protocol. The prepare to L1 is executed on ETHREAD, the prepare to E1 is executed on ETHREAD, and the prepare to E2 likewise is executed on ETHREAD. The commit to L1 is executed on ETHREAD, the commit to E1 is executed on ETHREAD and, lastly, the commit to E2 is executed on ETHREAD. At the end of commit processing, the recovery manager switches back to ATHREAD to return to the application. In total, two thread switches have occurred to implement the two phase commit process.

Figure 3:
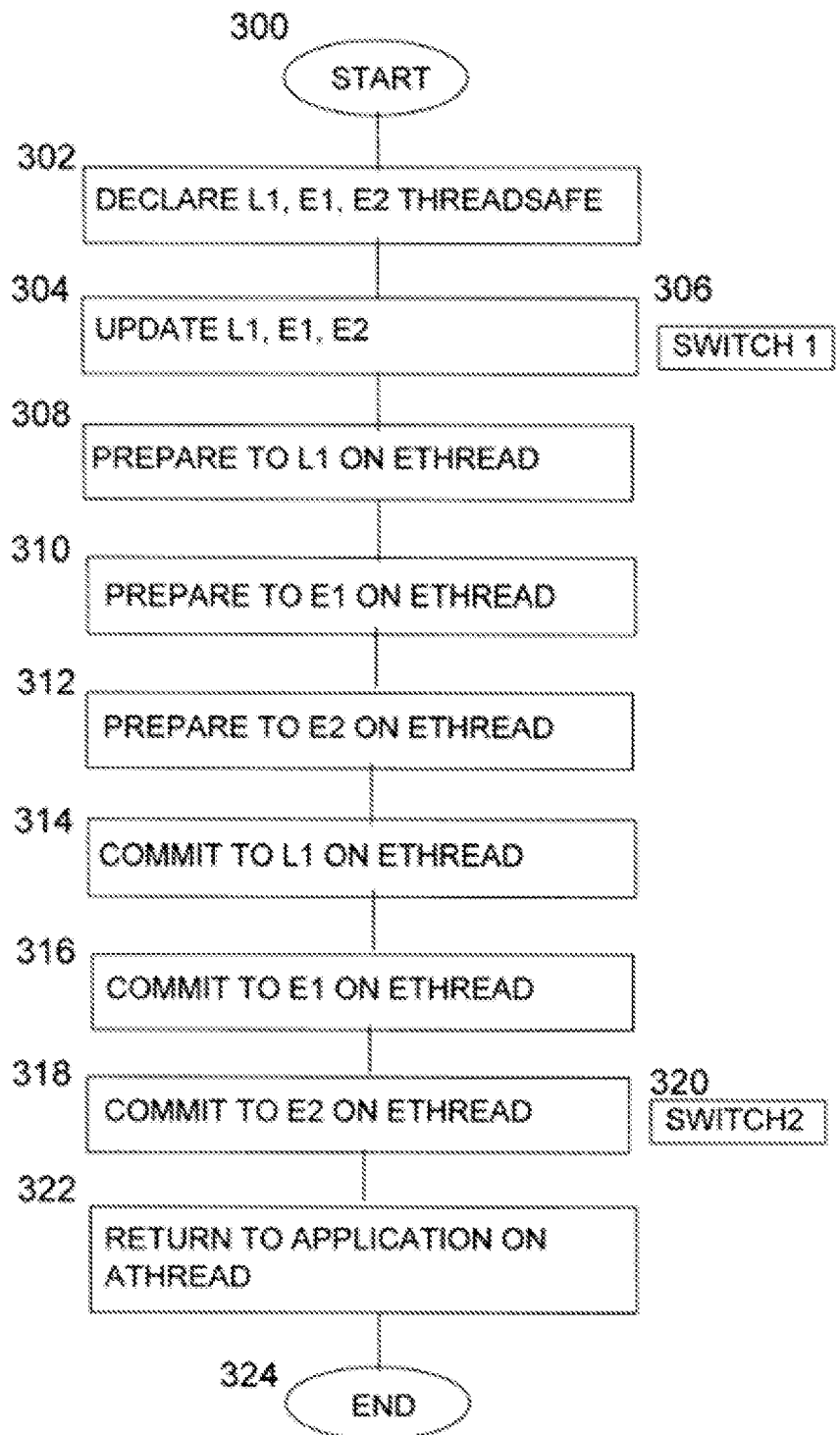
FIG. 3 shows a sequence of process operations according to a preferred embodiment of the present invention.

This is illustrated on FIG. 3, in which the process commences at START step 300. At step 302, L1, E1 and E2 are declared to be threadsafe. Step 304, in which updates are made to L1, E1 and E2, causes switch 1 306 from ATHREAD to ETHREAD. At step 308 a prepare is issued to L1 on selected thread ETHREAD. At steps 310, 312, prepares are issued to E1 and E2 on ETHREAD. At steps 314, 316, 318, commits are issued to L1, E1 and E2 on ETHREAD. Completion of step 318 causes switch 2 320 from ETHREAD to ATHREAD, and at step 322, the process returns to the application on ATHREAD. The process completes at END step 324.

In the known art, the lowest common denominator is ATHREAD, and so, typically, recovery managers execute two phase commit on the application thread ATHREAD and switch threads for each resource manager call as necessary. With the optimization, the recovery manager can choose the lowest common denominator to be ETHREAD and run its own processing on ETHREAD as well as calls to the resource managers.

It will, of course, be clear to one of ordinary skill in the art that the amount of performance optimization gained depends upon what resource managers are involved in a unit of work. A non-threadsafe resource manager will cause a switch back to ATHREAD from ETHREAD.

Preferred embodiments of the present invention applied industrially thus advantageously allow the recovery manager to pick, if possible, a single thread to minimize the amount of thread switching required for the commit processing and maximize time spent on the single thread. This gives benefits in terms of less CPU resource consumed (due to less thread switching) and increased throughput benefits, as thread switching typically results in delays caused by waiting for a thread to be redispatched on a processor. Even where it is not possible to use a single thread, the preferred embodiments of the present invention advantageously permit the use of the minimum number of threads, thus gaining advantages in reducing thread-switching.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A multiprocessing transaction recovery manager, operable with a transactional application manager and a resource manager, comprising:
  a memory allocated to store a threadsafety indicator for receiving and storing a positive threadsafety data and a non-positive threadsafety data of at least one transactional component managed by one of said transactional application manager and said resource manager, wherein the positive threadsafety data confirms the multiprocessing recovery manager has no affinity to an application thread and the non-positive threadsafety data has affinity to the application thread;
  a commit protocol component for performing commit processing for said at least one transactional component; and
  a thread selector responsive to the positive threadsafety data for selecting a single thread for said commit processing to be performed by said commit protocol component, wherein said thread selector is further operable to select plural threads for said commit processing to be performed by said commit protocol component responsive to the non-positive threadsafety data and thread selector is further operable to select minimal plural threads for said commit processing to be performed by said commit protocol component responsive to a mixture of the positive threadsafety data and the non-positive threadsafety data stored for plural said transactional components by grouping threadsafe transactional components for said commit processing under a single thread.

2. The multiprocessing transaction recovery manager of claim 1, wherein said resource manager is a database management system.

3. The multiprocessing transaction recovery manager of claim 1, wherein the commit protocol component is operable to perform two-phase commit processing.

4. A method of operating a multiprocessing transaction recovery manager, in communication with a transactional application manager and a resource manager, comprising the steps of:
  receiving and storing, by a threadsafety indicator, a positive threadsafety data and a non-positive threadsafety data of at least one transactional component managed by one of said transactional application manager and said resource manager, wherein the positive threadsafety data confirms the multiprocessing recovery manager has no affinity to an application thread and the non-positive threadsafety data has affinity to the application thread;
  performing, by a commit protocol component, commit processing for said at least one transactional component;
  responsive to the positive threadsafety data, selecting, by a thread selector, a single thread for said commit processing to be performed by said commit protocol component;
  selecting, by said thread selector, plural threads for said commit processing to be performed by said commit protocol component responsive to the non-positive threadsafety data; and
  selecting, by said thread selector, minimal plural threads for said commit processing to be performed by said commit protocol component responsive to a mixture of the positive threadsafety data and the non-positive threadsafety data stored for plural said transactional components by grouping threadsafe transactional components for said commit processing under a single thread.

5. The method of claim 4, wherein said resource manager is a database management system.

6. The method of claim 4, wherein the commit protocol component is operable to perform two-phase commit processing.

7. A computer program product for managing the application assignments to processing threads, the computer program product comprising: a computer readable storage device;
  first program instructions to receive, by a threadsafety indicator, a positive threadsafety data and a non-positive threadsafety data of at least one transactional component, wherein the positive threadsafety data and the non-positive threadsafety data is managed by one of the transactional application manager and the resource manager, wherein the positive threadsafety data confirms a recovery manager has no affinity to an application thread and the non-positive threadsafety data has affinity to the application thread;
  second program instructions to perform commit processing, by a commit protocol component, for the at least one transactional component;

third program instructions to select, by a thread selector, a single thread for commit processing to be performed by the commit protocol component, based on the positive threadsafety data;

fourth program instructions to select plural threads for the commit processing to be performed by the commit protocol component responsive to the non-positive threadsafety data; and fifth program instructions to select minimal plural threads for said commit processing to be performed by the commit protocol component responsive to a mixture of the positive threadsafety data and the non-positive threadsafety data stored for plural said transactional components by grouping threadsafe transactional components for said commit processing under a single thread, wherein the first, second, third, fourth and fifth program instructions are stored on the computer readable storage device, and the computer readable storage device is not a signal per se.

8. The computer program product of claim 7, wherein the resource manager is a database management system.

9. The computer program product of claim 7, wherein the commit protocol component is operable to perform two-phase commit processing.

\* \* \* \* \*